Aug. 23, 1938.    M. FREUND    2,127,558
WIRE SPRING FOR CUSHIONED SEATS OF VEHICLES
Filed Nov. 9, 1935    2 Sheets-Sheet 1
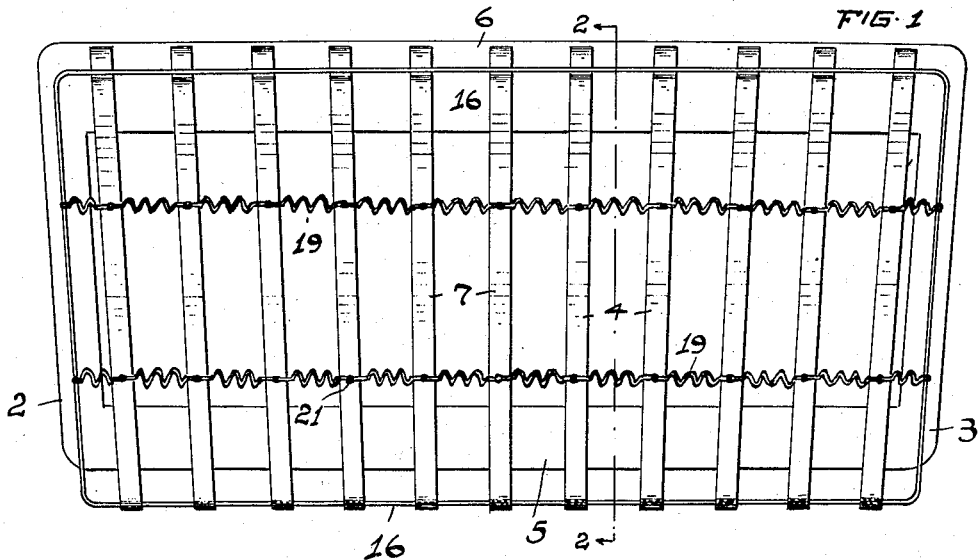
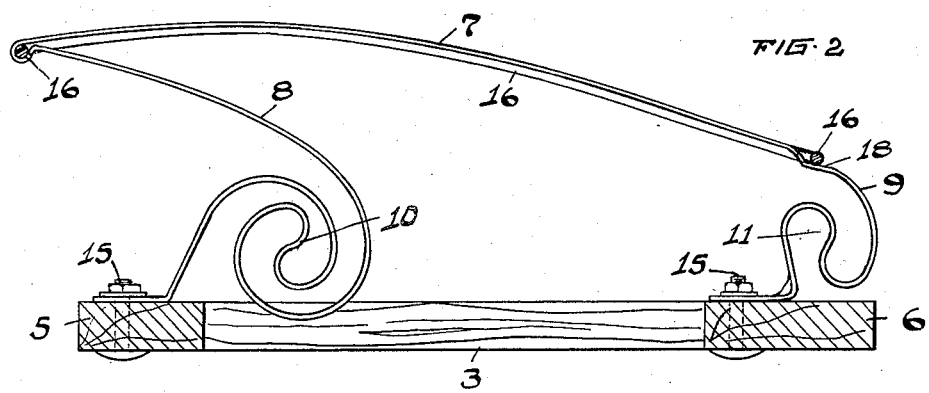
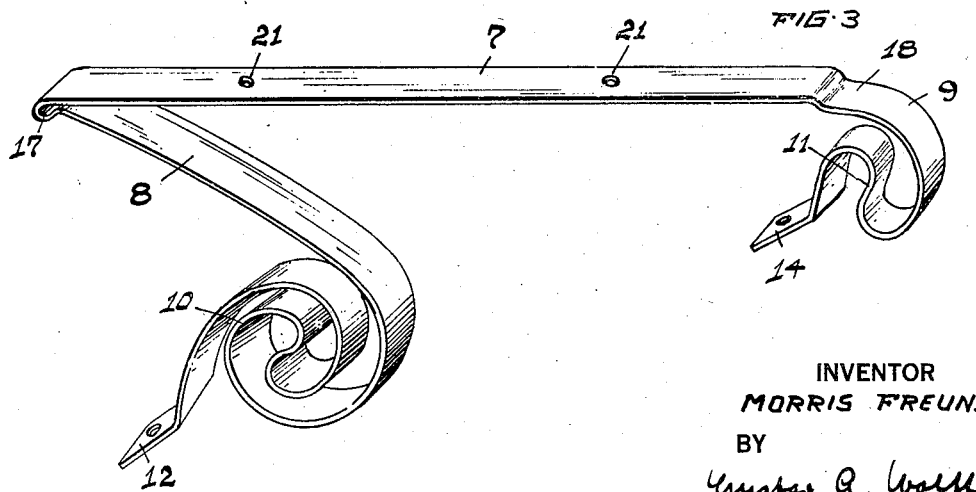
INVENTOR
MORRIS FREUND
BY
Gustav A. Wolff
ATTORNEY Aug. 23, 1938.   M. FREUND   2,127,558
WIRE SPRING FOR CUSHIONED SEATS OF VEHICLES
Filed Nov. 9, 1935   2 Sheets-Sheet 2
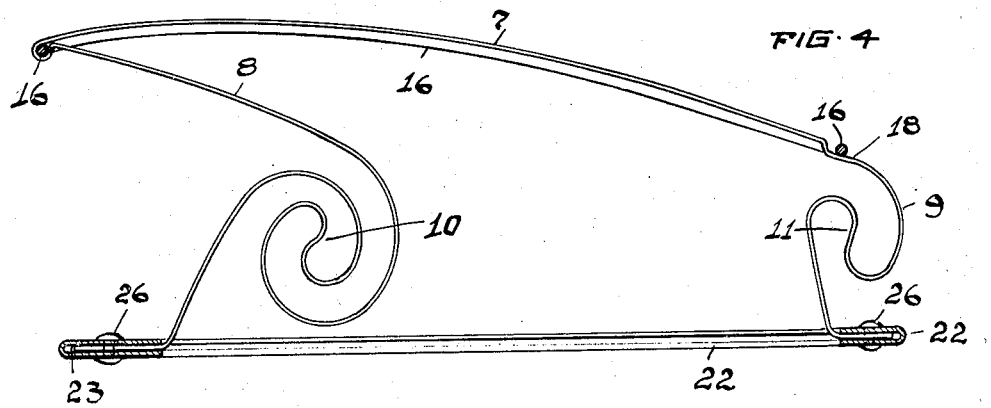
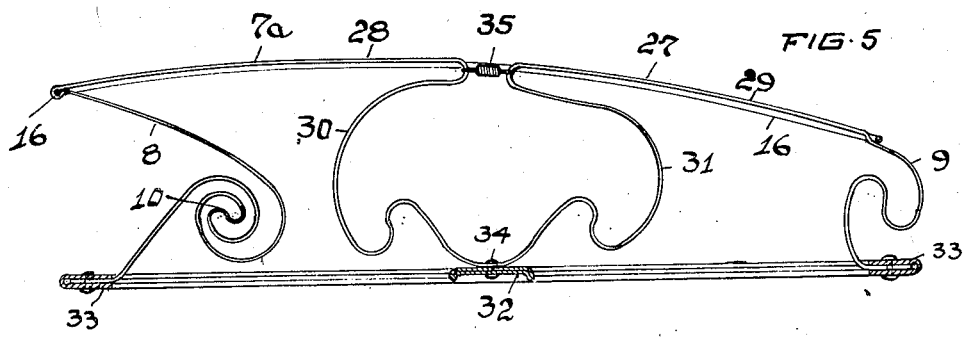
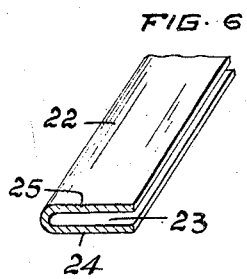
INVENTOR
MORRIS FREUND
BY
Gustav A. Wolff
ATTORNEY Patented Aug. 23, 1938

2,127,558

UNITED STATES PATENT OFFICE

2,127,558

WIRE SPRING FOR CUSHIONED SEATS OF VEHICLES

Morris Freund, Cleveland, Ohio, assignor, by direct and mesne assignments, of one-half to Jacob Kronheim, Shaker Heights, Ohio, and one-half to John C. Lincoln, Scottsdale, Ariz.

Application November 9, 1935, Serial No. 49,089

1 Claim. (Cl. 155—179)

This invention relates in general to springs and more particularly to springs for yielding seat frames in moving vehicles, such as automobiles, trains etc. The springs in seat frames of moving vehicles, when under load and the vehicle traveling at variable speeds, are subjected to vertical and lateral stresses, however the springs in present day seat frames for moving vehicles merely counteract vertical stresses, whereas lateral stresses, due to change of the traveling speed of the vehicle, are unchecked and free to unbalance the cushioning effect of the seat frames in moving vehicles.

It is the primary object of this invention to provide a spring for seat frames of moving vehicles, which spring will counteract vertical and lateral stresses under load, when the vehicle is travelling at variable speeds.

Another object of the invention is the provision of a spring for use in seat frames of moving vehicles, which spring embodies a resilient, vertically and laterally shiftable, load supporting portion, and means at opposite ends of said portion for resiliently counteracting vertical and lateral stresses on said portion.

A further object of the invention is the provision of a spring of the type referred to above in which the resilient means at opposite ends of the load supporting portion differ in resiliency, so as to effect an increase and/or decrease in the stiffness of this portion proportionate to the vertical and lateral stresses.

In addition the invention has certain other marked superiorities, which radically distinguish it from presently known structures. These improvements or superior characteristics embodying certain novel features of construction are clearly set forth in the appended claim, and a preferred form of embodiment of the invention is hereinafter shown with reference to the accompanying drawings forming part of the specification.

In these drawings:

Figure 1 is a plan view of a seat frame of a cushioned automobile seat embodying individual, vertical and lateral stresses absorbing springs according to the invention.

Figure 2 is an enlarged cross sectional view through the seat frame structure shown in Figure 1, the section being taken on line 2—2 of Figure 1.

Figure 3 is a perspective view of one of the springs used in the frame shown in Figure 1.

Figure 4 is a cross sectional view similar to Figure 1 of a seat frame embodying a somewhat modified and simplified sheet metal base member.

Figure 5 is a cross sectional view similar to Figure 4 of a seat frame embodying somewhat modified spring structures.

Figure 6 is a fragmentary perspective view of the sheet metal base member shown in Figure 4.

Figure 7 is a perspective view of one of the spring tie members used to tie the individual springs of the seat frame shown in Figure 1.

Referring more particularly to the drawings reference numeral 2 represents a seat frame of a cushioned automobile seat, which frame embodies an elongated wooden base 3, supporting a plurality of elongated springs 4. The springs 4, preferably made of steel bands or steel wire, are arranged crosswise of the base 3 and secured to the front and rear rails 5 and 6 thereof. Each of the springs 4 is formed with an elongated, straight supporting portion 7, which carries at its front and rear ends integral, rearwardly and downwardly extending arms 8 and 9 respectively. The arms 8 and 9 are looped in opposite directions as at 10 and 11 to facilitate their bending action. The looped portion 10 on arm 8 is larger in diameter than the looped portion 11 on arm 9, so that arm 8 offers less bending resistance than arm 9. The arms 8 and 9 are furthermore provided with perforated extensions 12 and 14, which are arranged in planes inclined with respect to the plane in which extends the straight portion 7, so that, when the springs are secured to the front and rear rails of the base 4 by means of bolts 15, the coiled or looped portions 10 and 11 of the arms 8 and 9 are under tension and by submitting part of this tension to the portion 7, bulge this portion outwardly, as will be clearly seen in Figure 2.

The arm 8 at the front of the portion 7 is substantially longer than the arm 9 at the rear thereof, and the looped portion 10 is of less bending resistance than the looped portion 11, therefore the spring structure yieldingly resists a downward bulging of its portion 7 proportionate to the load and also absorbs stresses on the load caused by acceleration and/or deceleration of the vehicle movement, when the longitudinal axis of the spring extends substantially in the direction of travel of the vehicle embodying a seat frame with springs according to the invention.

Thus under load lever arms 8 and 9, both of which extend rearwardly and downwardly, effect a forward and downward movement of the supporting portions of the springs, when the springs are under load and when the forward travel of the vehicle, embodying seat frames of the type described, is retarded. Such a movement of the springs is due to the inertia of the load, tending to continue to travel at unretarded speed, it being understood that the load transfers its movement to the supporting portion of the spring on which the load rests. Consequently the thus induced forward and downward movement of the supporting portion of the spring yieldingly absorbs braking shocks on the load. An accelerated forward movement of the vehicle of course will effect a rearward and upward shock absorbing movement of the supporting portions of the springs and the load carried thereby.

The supporting portions of the springs support at their front and rear ends an edge wire 16. To that effect the front ends of the supporting portions are bent to open sleeves 17 adapted to yieldingly and pivotally clamp and support the edge wire 16, and the rear ends of the supporting portions 7 are downwardly offset to form a seat 18 for slidably supporting the wire 16 and permit of individual free bending action of the springs with respect to the edge wire 16. Furthermore, the individual springs 4 are laterally yieldingly tied together by means of short, flat springs 19, having their hooked ends 20 inserted in perforations 21 in the supporting portions 7 of the springs 4.

In some cases it might be desirable to use a metal base 22 (see Figure 4) instead of the wooden base shown in Figures 1 and 2. This base consists of sheet metal, which is doubled back upon itself, so that the perforated ends 12 and 14 of the springs 4 can readily be sprung into the space 23 between the opposed top and bottom walls 24 and 25 of the base 22 and riveted thereto by means of rivets 26.

If it is desirable to make the seating surface wider, as for example for davenports, etc., then the length of the supporting portions of the springs should be subdivided into shorter sections. Such a construction is shown in Figure 5. In this structure the front and rear arms 8 and 9 of the spring 27 are similar to those in Figures 1, 2 and 3. The seating portion 7a of the spring 27, however, embodies two portions 28, 29, which portions are yieldingly supported at their inner ends by integral looped arms 30, 31. These arms are rigidly connected to a cross member 32 in a frame 33 by means of rivets 34. The spring 27 thus embodies an additional support for its supporting portion 7a, which support is arranged between its opposite ends and prohibits excessive downward deflection of the spring under load. The subdivisions 28, 29 are preferably tied together by a short, stiff coil spring 35, which spring is secured to the inner ends of the subdivisions.

Having thus described my invention, what I claim is:

An elongated spring for cushioned seats and the like comprising an elongated, yielding load supporting portion, integral, substantially parallel, yielding supporting means for said portion extending from the opposite ends thereof rearwardly and downwardly at an inclination with respect to said portion, integral means between one of said supporting means and said supporting portion for pivotally attaching an edge wire member thereto, and an offset, substantially horizontal seating portion for said edge wire between said supporting portion and the other one of said supporting means to permit of free bending of said supporting portion with respect to the edge wire carried thereby.

MORRIS FREUND.